US009654558B2

(12) United States Patent
Doster et al.

(10) Patent No.: US 9,654,558 B2
(45) Date of Patent: May 16, 2017

(54) MANAGING A STORAGE SYSTEM

(71) Applicant: International Business Machines Corporation, Armonk, NY (US)

(72) Inventors: Bard A. Doster, Tucson, AZ (US); Sharon M. Niederbrach, Tucson, AZ (US); David C. Reed, Tucson, AZ (US); Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 623 days.

(21) Appl. No.: 13/943,285

(22) Filed: Jul. 16, 2013

(65) Prior Publication Data
US 2015/0026311 A1 Jan. 22, 2015

(51) Int. Cl.
*H04L 29/08* (2006.01)
*H04L 12/24* (2006.01)
*G06F 3/06* (2006.01)

(52) U.S. Cl.
CPC ........ *H04L 67/1097* (2013.01); *G06F 3/0629* (2013.01)

(58) Field of Classification Search
CPC H04L 41/0806; H04L 67/1097; G06F 3/0629
USPC .......................................... 709/220; 711/170
See application file for complete search history.

(56) References Cited

U.S. PATENT DOCUMENTS

| | | | |
|---|---|---|---|
| 5,790,886 A * | 8/1998 | Allen | G06F 3/0608 710/16 |
| 5,890,014 A * | 3/1999 | Long | G06F 13/10 703/13 |
| 6,223,171 B1 | 4/2001 | Chaudhuri et al. | |
| 6,311,232 B1 * | 10/2001 | Cagle | G06F 11/2289 710/10 |
| 8,326,825 B2 | 12/2012 | Nehme et al. | |
| 8,626,897 B2 * | 1/2014 | Guo | G06F 11/3442 709/223 |
| 8,898,261 B1 * | 11/2014 | Patsenker | H04L 41/046 709/213 |
| 2003/0055863 A1 * | 3/2003 | Spiegel | G06F 9/5061 718/104 |
| 2003/0195953 A1 * | 10/2003 | Suzuki | H04L 29/06 709/220 |
| 2004/0044826 A1 * | 3/2004 | Dawson | G06F 3/0607 711/4 |
| 2004/0044829 A1 * | 3/2004 | Dawson | G06F 3/0605 711/4 |
| 2004/0064543 A1 * | 4/2004 | Ashutosh | H04L 69/329 709/224 |
| 2005/0033935 A1 * | 2/2005 | Manbert | G06F 3/0608 711/170 |
| 2006/0031508 A1 | 2/2006 | Gellai et al. | |
| 2006/0106819 A1 * | 5/2006 | Dhanadevan | G06F 3/0605 |

(Continued)

*Primary Examiner* — Kostas Katsikis
(74) *Attorney, Agent, or Firm* — Peter J. Edwards

(57) ABSTRACT

A first operational characteristic of a first configuration of a storage system is determined. The determination may be made using first data of the first configuration of the storage system and second data related to element interactions of the storage system. At least a second configuration of the storage system that differs from the first configuration is generated using the second data. At least a second operational characteristic of the second configuration is predicted using the second data.

20 Claims, 4 Drawing Sheets

(56) References Cited

U.S. PATENT DOCUMENTS

| | | | | |
|---|---|---|---|---|
| 2006/0224851 | A1* | 10/2006 | Tamura | G06F 3/0605 711/170 |
| 2006/0230103 | A1* | 10/2006 | Takamoto | H04L 69/40 709/203 |
| 2007/0198797 | A1* | 8/2007 | Kavuri | G06F 3/061 711/165 |
| 2007/0250920 | A1* | 10/2007 | Lindsay | G06F 21/31 726/7 |
| 2009/0240783 | A1* | 9/2009 | Susairaj | G06F 17/30203 709/217 |
| 2010/0169253 | A1* | 7/2010 | Tan | G06F 9/5088 706/21 |
| 2010/0299309 | A1* | 11/2010 | Maki | G06F 11/1479 707/640 |
| 2010/0332646 | A1* | 12/2010 | Balasubramanian | G06F 9/5016 709/224 |
| 2011/0119441 | A1* | 5/2011 | Peake | G06F 3/0605 711/112 |
| 2011/0225360 | A1* | 9/2011 | Baptist | G06F 12/0646 711/114 |
| 2011/0307745 | A1* | 12/2011 | McCune | G06F 17/30221 714/54 |
| 2012/0254340 | A1* | 10/2012 | Velummylum | G06F 17/30126 709/213 |
| 2013/0054528 | A1* | 2/2013 | Saika | G06F 3/0608 707/638 |
| 2014/0365622 | A1* | 12/2014 | Iyengar | H04L 67/1097 709/220 |

* cited by examiner

MANAGING A STORAGE SYSTEM

TECHNICAL FIELD

This disclosure relates generally to computer systems and, more particularly, relates to data storage.

BACKGROUND

The amount of data that needs to be managed by enterprises is growing at an extremely high rate. Management of storage environments may be performed by storage service providers or customers. Storage environments may be setup and tuned. As data needing to be managed increases, the need for management may increase.

SUMMARY

Aspects of the disclosure may include a method of and system for managing a storage system. The method and system may include determining a first operational characteristic of a first configuration. The determination may be made using first data of the first configuration of the storage system and second data related to element interactions of the storage system. The method and system may include generating, using the second data, at least a second configuration of the storage system that differs from the first configuration. The method and system may include predicting, using the second data, at least a second operational characteristic of the second configuration.

Aspects of the disclosure, in embodiments, may include collecting the first data of the first configuration of the storage system. At least a third configuration of the storage system that differs from the first and second configurations may be generated. The generation of the third configuration may use the second data. At least a third operational characteristic of the third configuration may be predicted. The prediction of the third operational characteristic of the third configuration may be made using the second data. A suggested configuration for the storage system based on a preferred operational characteristic may be proposed. A chosen configuration for the storage system may be established. Training may occur as to how to establish at least one possible configuration for the storage system.

DETAILED DESCRIPTION

Figure 1:
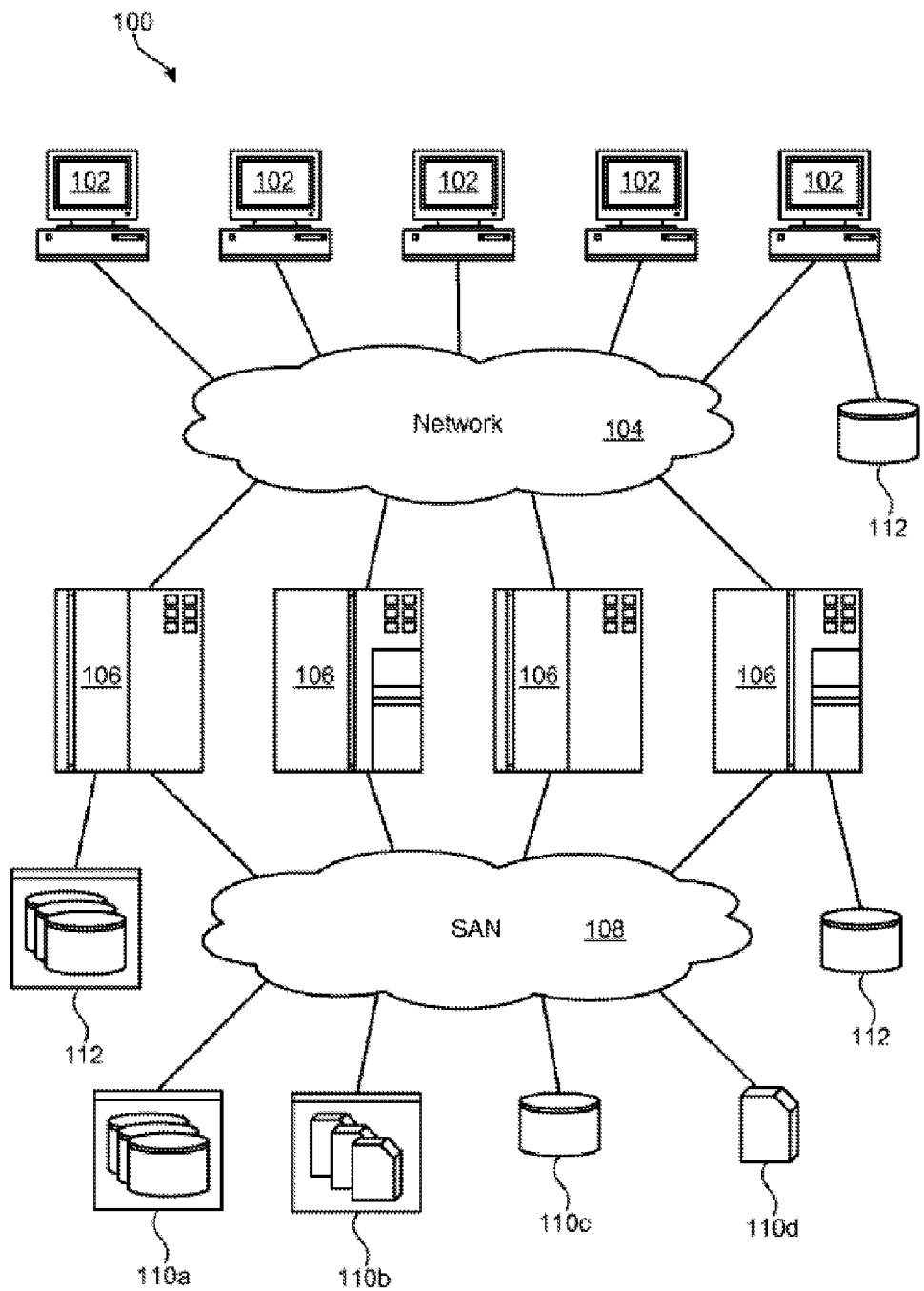
FIG. 1 illustrates an example network architecture according to embodiments.

Aspects of the disclosure generate recommendations for configuration settings of data storage. The recommendations may be provided to a customer. The recommendations may include multiple options or alternatives. The recommendations may be generated based on analysis of information collected about current settings. Results of the recommendations, including the alternatives, may be predicted. Significant amounts of resources of multiple parties may be saved.

Determining how objects are stored and managing movements in object hierarchies can make it difficult for customers of a data storage technology provider to have a properly setup environment. Many days can be spent by customers trying to setup and tune these environments. Customers may have to spend a significant amount of time with the data storage technology provider for development purposes in order to analyze, diagnose, and provide change recommendations to customers in order to address issues where objects are not stored as desired, and provide tuning recommendations based on customer concerns regarding storage usage or performance. A better tuning process may be useful. The reduction in time spent may reduce costs, and could be sold as a service offering by the data storage technology provider or an outside vendor.

Aspects of the disclosure include a method and a system for managing a storage facility (i.e., storage system). A first operational characteristic of a first configuration of the storage system may be determined. The determination may be made using first data of the first configuration and second data related to element interactions of the storage system. At least a second configuration of the storage system that differs from the first configuration may be generated. The generation of the second configuration may use the second data. At least a second operational characteristic of the second configuration may be predicted. The prediction of the second operational characteristic of the second configuration may be made using the second data. For example, information related to how components (e.g., hardware) of the storage system interact may be used to predict overall system performance or how storage is used under the second configuration.

In embodiments, the first data of the first configuration of the storage system may be collected. At least a third configuration of the storage system that differs from the first and second configurations may be generated. The generation of the third configuration may use the second data. At least a third operational characteristic of the third configuration may be predicted. The prediction of the third operational characteristic of the third configuration may be made using the second data. A suggested configuration for the storage system based on a preferred operational characteristic may be proposed. A chosen configuration for the storage system may be established. Training may occur as to how to establish at least one possible configuration for the storage system.

In embodiments, there can be a variety of different categories of information. For instance, the first data may have a storage-construct category of information that includes a storage group, a management class, and a storage class. The first data may have an automatic-class-selection (ACS) routine category of information that includes transition outcomes for the management class and the storage class (e.g., results from an object changing a class or being assigned to a different class). The first data may have an administration category of information that includes naming information. The first data may have a directory category of information that includes metadata about objects. The first data may have a parameter-settings category of information that includes client preferences, delay information, and allocation choices. The first data may have an exit category of information that includes object expiration permissions. The first data may have a client preference category of information related to a performance factor and a storage usage factor. Other categories of information are possible as well.

In embodiments, the second data related to element interactions of the storage system may include information related to an interaction of components of the storage system. The second data may be associated with at least one of a storage-construct category of information, an ACS-routine category of information, an administration category of information, a directory category of information, a parameter-settings category of information, an exit category of information, and a client preference category of information. The first and second configurations may include at least one value for at least one of a storage-construct category of information, an ACS-routine category of information, an administration category of information, a directory category of information, a parameter-settings category of information, an exit category of information, and a client preference category of information. The first and second operational characteristics may include at least one of a performance factor and a storage usage factor. Aspects of the disclosure may save significant amounts of resources of multiple parties.

FIG. 1 illustrates an example network architecture 100 according to embodiments. The network architecture 100 is presented to show one example of an environment where a system and method in accordance with the disclosure may be implemented. The network architecture 100 is presented only by way of example and is not intended to be limiting. The system and methods disclosed herein may be applicable to a wide variety of different computers, servers, storage devices, and network architectures, in addition to the network architecture 100 shown.

As shown, the network architecture 100 includes one or more computers 102, 106 interconnected by a network 104. The network 104 may include, for example, a local-area-network (LAN), a wide-area-network (WAN), the Internet, an intranet, or the like. In certain embodiments, the computers 102, 106 may include both client computers 102 and server computers 106 (also referred to herein as "host systems" 106 or alternatively as "host devices"). In general, client computers 102 may initiate communication sessions, whereas server computers 106 may wait for requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like. One or more of the storage systems 112 may contain storage pools that may benefit from techniques of the disclosure.

The network architecture 100 may, in certain embodiments, include a storage network 108 behind the servers 106, such as a storage-area-network (SAN) or a LAN (e.g., when using network-attached storage). This network 108 may connect the servers 106 to one or more storage systems 110 (alternatively, remote systems or remote devices), such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC). One or more of the storage systems 110 may contain storage pools that may benefit from techniques according to the disclosure.

Configuration of the storage systems 110 can be affected by the particular use and environment. In certain instances, the particular use or environment may not be known during initialization and setup. Aspects of the disclosure are directed toward intelligent analysis of the system environment in order to generate and provide recommendations for configuring the storage systems 110. For instance, the recommendations can suggest modifications to where objects are stored, and provide tuning recommendations related to storage usage or performance. As discussed in more detail herein, such analysis can consider information such as storage management system (SMS) constructs, information in data base tables (e.g., DB2 tables), parmlib members, and other information related to the storage hardware of storage systems 110.

Figure 2:
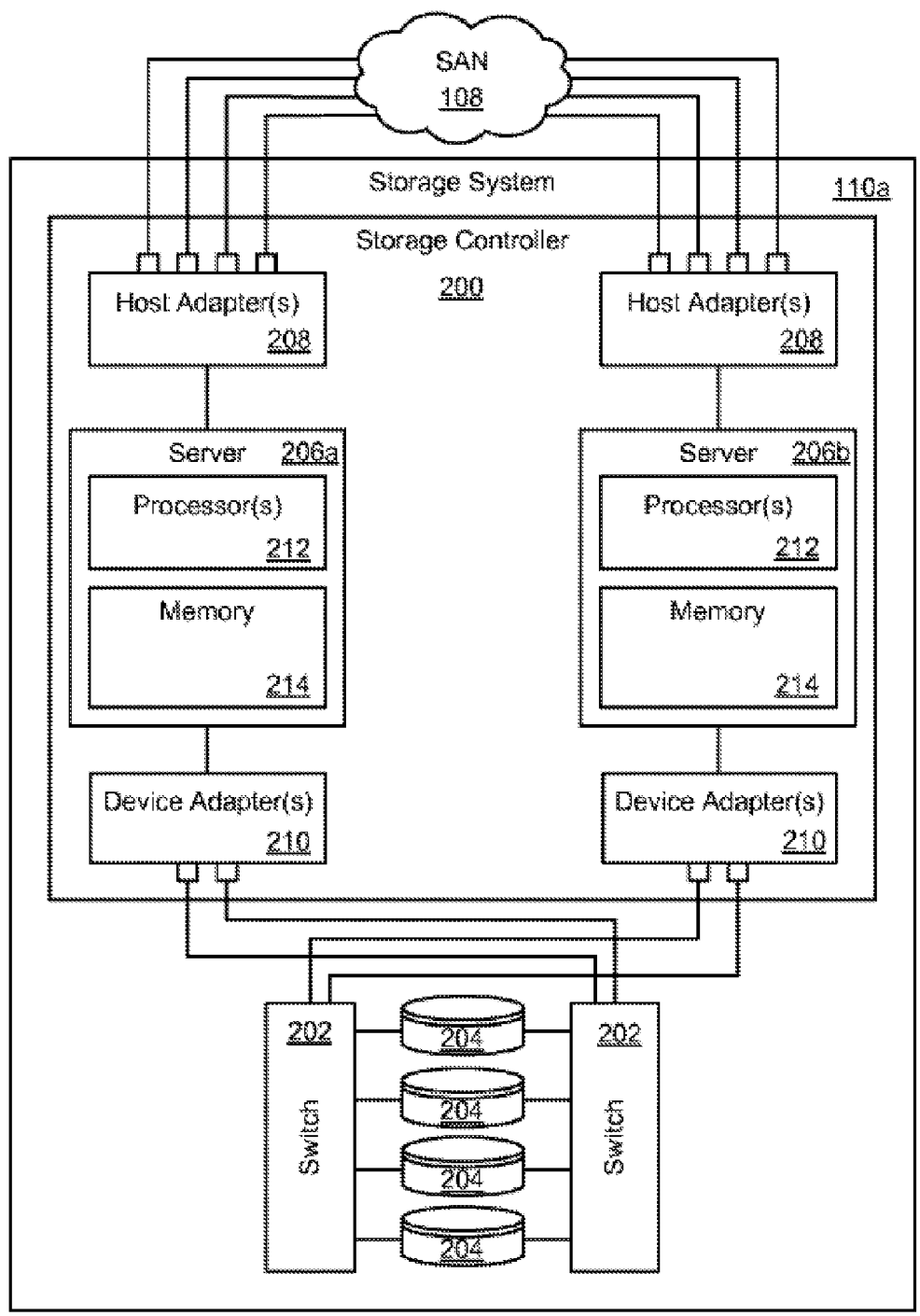
FIG. 2 illustrates an example storage system containing an array of storage devices according to embodiments.

FIG. 2 illustrates an example storage system 110a containing an array of storage devices 204 (e.g., hard-disk drives and/or solid-state drives) according to embodiments. The internal components of the storage system 110a are shown in accordance with the disclosure and may be used to manage such a storage system 110a. Nevertheless, techniques according to the disclosure may also be implemented within other storage systems 110, 112. As shown, the storage system 110a includes a storage controller 200, one or more switches 202, and one or more storage devices 204, such as hard-disk drives or solid-state drives (e.g., flash-memory-based drives). The storage controller 200 may enable one or more hosts 106 (e.g., open system and/or mainframe servers 106) to access data stored in the one or more storage devices 204.

As shown in FIG. 2, the storage controller 200 includes one or more servers 206. The storage controller 200 may also include host adapters 208 and device adapters 210 to connect the storage controller 200 to host devices 106 and storage devices 204, respectively. Multiple servers 206a, 206b may provide redundancy to ensure that data is always available to connected hosts 106. Thus, when one server 206a fails, the other server 206b may remain functional to ensure that I/O is able to continue between the hosts 106 and the storage devices 204. This process may be referred to as a "failover."

Particular enterprise storage systems may have a storage system 110a having an architecture similar to that illustrated in FIG. 2. Particular enterprise storage systems may include a high-performance, high-capacity storage controller providing disk storage that is designed to support continuous operations. Particular enterprise storage systems may use servers 206a, 206b, which may be integrated with a virtualization engine technology. Nevertheless, techniques according to the disclosure are not limited to any specific enterprise storage system 110a, but may be implemented in any comparable or analogous storage system 110 regardless of the manufacturer, product name, or components or component names associated with the storage system 110. Any storage system 110 that could benefit from techniques according to the disclosure is deemed to fall within the scope of the disclosure. Thus, the enterprise storage system shown is presented only by way of example and is not intended to be limiting.

In selected embodiments, each server 206 includes one or more processors 212 (e.g., n-way symmetric multiprocessors) and memory 214. The memory 214 may include volatile memory (e.g., RAM) as well as non-volatile memory (e.g., ROM, EPROM, EEPROM, hard disks, flash memory, etc.). The volatile memory and non-volatile memory may store software modules that run on the processor(s) 212 and are used to access data in the storage devices 204. The servers 206 may host at least one instance of these software modules. These software modules may manage all read and write requests to logical volumes in the storage devices 204.

Consistent with various embodiments, the configuration of storage system 110a can be analyzed during actual (customer) usage. The analysis can then be used to modify configuration settings. For instance, the analysis may identify where various data objects should be stored within the various storage devices 204. This can include considerations such as access times and available data bandwidth of the various storage devices 204. Other considerations can include one or more of the following non-limiting items: usage patterns for related data, prioritization of certain data types, and reliability concerns.

Figure 3:
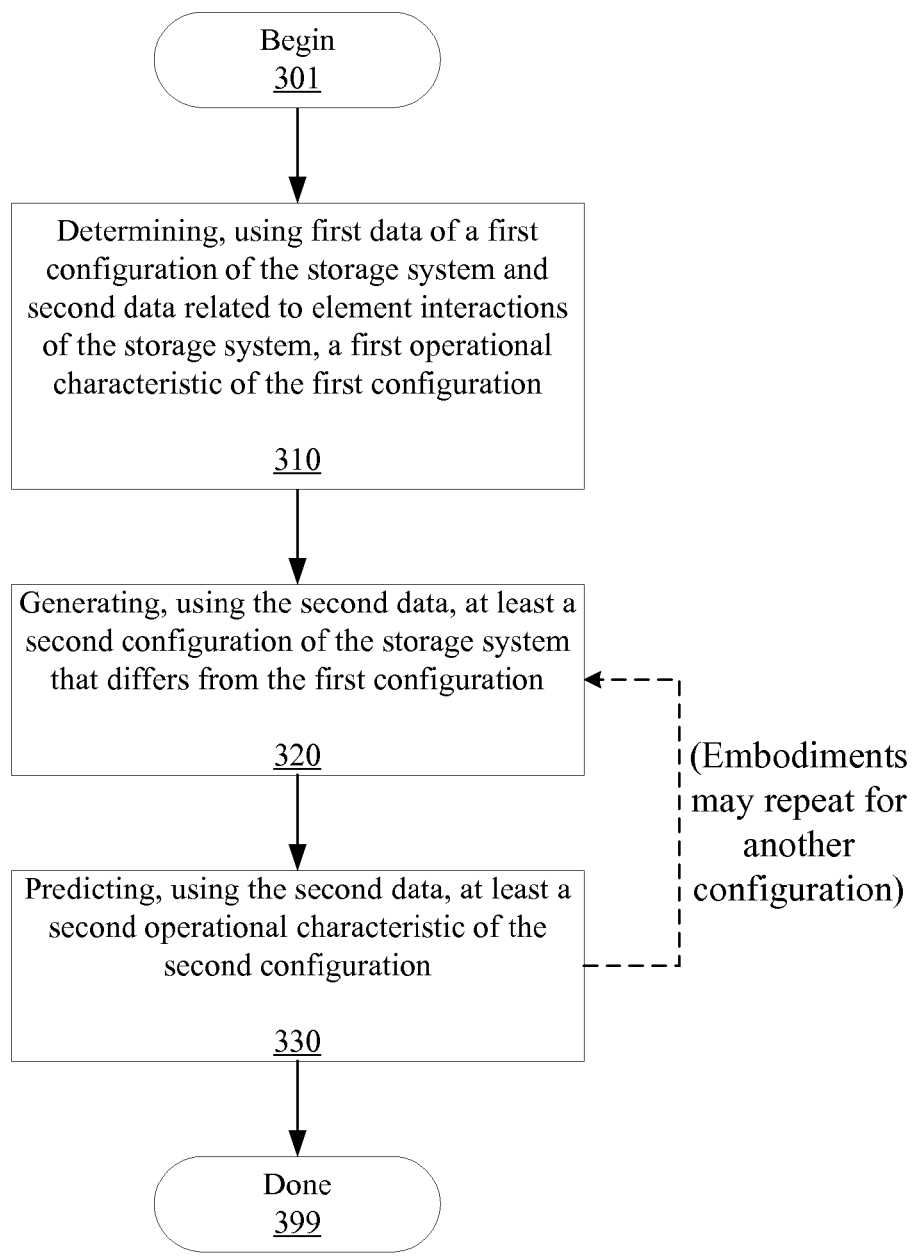
FIG. 3 is a flowchart illustrating a method for managing a storage system according to embodiments.

FIG. 3 is a flowchart illustrating a method 300 for managing a storage system according to embodiments. Method 300 may begin at block 301. In embodiments, first data of a first configuration of the storage system (e.g., storage hardware) may be collected. The first data may have a storage-construct category of information that includes a storage group, a management class, and a storage class. The first data may have an automatic-class-selection (ACS) routine category of information that includes transition outcomes for the management class and the storage class. The first data may have an administration category of information that includes naming information. The first data may have a directory category of information that includes metadata about objects. The first data may have a parameter-settings category of information that includes client preferences, delay information, and allocation choices. The first data may have an exit category of information that includes object expiration permissions. The first data may have a client preference category of information related to a performance factor (e.g., effectiveness, efficiency, quality, timeliness, prioritization) and a storage usage factor (e.g., data integrity, allocation efficiency, resource contention, access pattern).

A first operational characteristic of the first configuration of the storage system may be determined (e.g., evaluated, analyzed) at block 310. The determination at block 310 may be made using the first data of the first configuration and second data related to element interactions of the storage system. In embodiments, the second data related to element interactions of the storage system may include information related to an interaction of components of the storage system (e.g., components described above related to FIGS. 1-2). The second data may include at least one of experiential information, historical information, and imbedded knowledge. The second data may be associated with at least one of the storage-construct category of information, the ACS-routine category of information, the administration category of information, the directory category of information, the parameter-settings category of information, the exit category of information, and the client preference category of information.

At least a second configuration of the storage system that differs from the first configuration may be generated (e.g., created, developed) at block 320. The generation of the second configuration at block 320 may use the second data. The first and second configurations may include at least one value for at least one of the storage-construct category of information, the ACS-routine category of information, the administration category of information, the directory category of information, the parameter-settings category of information, the exit category of information, and the client preference category of information.

At least a second operational characteristic of the second configuration may be predicted (e.g., forecasted, projected) at block 330. The prediction of the second operational characteristic of the second configuration at block 330 may be made using the second data. The first and second operational characteristics may include at least one of first and second results, first and second effects, and first and second outcomes (e.g., results, effects, or outcomes of the configurations). The first and second operational characteristics may include at least one of the performance factor and the storage usage factor.

In embodiments, at least a third configuration of the storage system that differs from the first and second configurations may be generated. The generation of the third configuration may use the second data. At least a third operational characteristic of the third configuration may be predicted. The prediction of the third operational characteristic of the third configuration may be made using the second data. A suggested (e.g., recommended) configuration for the storage system based on a preferred operational characteristic (e.g., preferring performance over storage usage, preferring storage usage over performance) may be proposed. A chosen configuration (e.g., one of the first, second, and third configurations) for the storage system may be established.

Method 300 may conclude at block 399. Aspects of method 300 may save significant amounts of resources of multiple parties. Aspects may provide tuning enhancements relative to a manual process. Aspects of method 300 may reduce time spent, reduce costs, or be sold as a service offering. Altogether, a storage system may be managed more efficiently.

Figure 4:
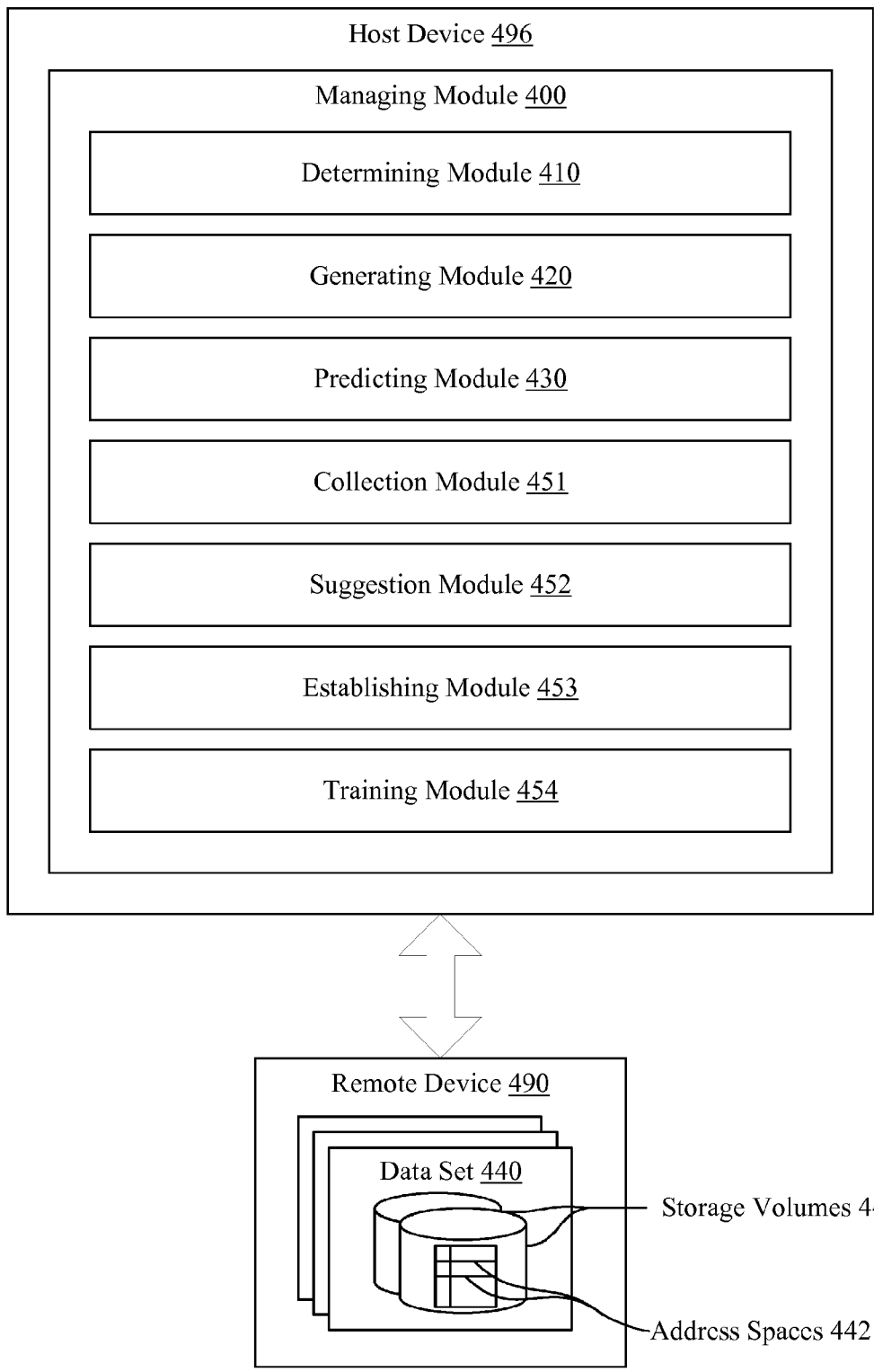
FIG. 4 shows modules of a system implementing a method according to embodiments.

FIG. 4 shows modules of a system implementing method 300 according to embodiments. In embodiments, method 300 may be implemented in the form of one or more modules. These modules may be implemented in hardware, software or firmware executable on hardware, or a combination thereof. For example, module functionality that may occur in a host device 496 may actually be implemented in a remote device 490 and vice versa. Other functionality may be distributed across the host device 496 and the remote device 490.

The host device 496 may include a managing module 400. The managing module 400 may be configured and arranged to manage a storage facility. The managing module 400 may include a determining module 410, a generating module 420, a predicting module 430, a collection module 451, a suggestion module 452, an establishing module 453, and a training module 454. The remote device 490 may have a data set 440 comprising storage volumes 441 having address spaces 442.

In embodiments, first data of a first configuration of the storage facility (e.g., storage hardware) may be collected using the collection module 451. The first data may have a storage-construct category of information that includes a storage group, a management class, and a storage class. The first data may have an automatic-class-selection (ACS) routine category of information that includes transition outcomes for the management class and the storage class. The first data may have an administration category of information that includes naming information. The first data may have a directory category of information that includes metadata about objects. The first data may have a parameter-settings category of information that includes client preferences, delay information, and allocation choices. The first data may have an exit category of information that includes object expiration permissions. The first data may have a client preference category of information related to a performance factor (e.g., effectiveness, efficiency, quality, timeliness, prioritization) and a storage usage factor (e.g., data integrity, allocation efficiency, resource contention, access pattern).

A first operational characteristic of the first configuration of the storage facility may be determined (e.g., evaluated, analyzed) using the determining module 410. The determining module may use the first data of the first configuration and second data related to element interactions of the storage facility. In embodiments, the second data related to element interactions of the storage facility may include information related to an interaction of components of the storage facility (e.g., components described above related to FIGS. 1-2). The second data may include at least one of experiential information, historical information, and imbedded knowledge. The second data may be associated with at least one of the storage-construct category of information, the ACS-routine category of information, the administration category of information, the directory category of information, the parameter-settings category of information, the exit category of information, and the client preference category of information.

At least a second configuration of the storage facility that differs from the first configuration may be generated (e.g., created, developed) using the generating module 420. The generating module 420 may use the second data to generate the second configuration. The first and second configurations may include at least one value for at least one of the storage-construct category of information, the ACS-routine category of information, the administration category of information, the directory category of information, the parameter-settings category of information, the exit category of information, and the client preference category of information.

At least a second operational characteristic of the second configuration may be predicted (e.g., forecasted, projected) using the predicting module 430. The predicting module 430 may use the second data to predict of the second operational characteristic of the second configuration. The first and second operational characteristics may include at least one of first and second results, first and second effects, and first and second outcomes (e.g., results, effects, or outcomes of the configurations). The first and second operational characteristics may include at least one of the performance factor and the storage usage factor.

In embodiments, at least a third configuration of the storage facility that differs from the first and second configurations may be generated. The generation of the third configuration may use the second data. At least a third operational characteristic of the third configuration may be predicted. The prediction of the third operational characteristic of the third configuration may be made using the second data. A suggested (e.g., recommended) configuration for the storage system based on a preferred operational characteristic (e.g., preferring performance over storage usage, preferring storage usage over performance) may be proposed using the suggestion module 452. A chosen configuration (e.g., one of the first, second, and third configurations) for the storage facility may be established using the establishing module 453. How to establish at least one possible configuration (e.g., one of the first, second, and third configurations) for the storage facility may be included in the training module 454.

Aspects of managing module 400 may save significant amounts of resources of multiple parties. Aspects may provide tuning enhancements relative to a manual process. Aspects of managing module 400 may reduce time spent, reduce costs, or be sold as a service offering. Altogether, a storage system may be managed more efficiently.

As a particular example that may be applied to embodiments of the method and system described, aspects of the disclosure may be illustrated in several phases. A first phase may be data collection to be used as input for analysis. A variety of data may be collected. Storage management system (SMS) constructs including a storage group, a management class and a storage class may be collected. The storage group construct may contain optical library affiliation and optical drive and volume usage preferences. The management class construct may contain object access method (OAM) specific expiration criteria, transition criteria (e.g., class changing criteria for objects), and backup requirements as specified by the customer. The storage class construct may contain the initial access response seconds (IARS) and sustained data rate (SDR) information as specified by the customer. ACS routines may provide SMS transition outcomes for SMS management class and storage class. OAM administration database (e.g., DB2) tables may provide object storage group names as well as default SMS construct information and current SMS construct names. OAM DB2 object directory tables may provide all of the metadata about each object such as creation date, last referenced date, current location, backup information and locations, recall status, expiration information, and any hold deletion information. OAM parmlib settings (e.g., settings for an object access method parameter library that is part of a data set in an operating system) such as IEFSSNxx (e.g., subsystem definitions) may contain the current customer settings for query backup, deletion hold preferences and last reference date updates. CBROAMxx parmlib may contain settings for object storage group to object backup storage group connections, wait times for tape mounts/demounts, number of total tape drives for the OAM address space and settings on how to allocate those tape drives across the object and object backup storage groups and storage usage preferences. Data associated with a customer modifiable exit (e.g., CBRHADUX user exit) which customers program to allow or disallow expiration of OAM objects may be collected. Input from customers on preferences in relation to performance versus storage usage may be collected.

The second phase may include analyzing the input data against experiential data or imbedded knowledge to show and predict storage activities based on current settings. Aspects of the disclosure may first select objects that would be processed or require processing from the DB2 object directory table based on today's date. The management class constructs, ACS routines, object directory information and CBRHADUX behavior may be used to determine current expiration status. Secondly, a transition status may be obtained by using the ACS routines, management class construct, storage class construct, and object directory table information to determine transition and back up requirements of the data that may be necessary in the storage hierarchy. Aspects of the disclosure may also review object directory tables to determine recall status and last access date for objects.

The next phase includes generating alternate improved settings based on analysis from existing settings. Once the data is captured, comparing predicted movement to determine throughput based on the existing parmlib values. Object transition patterns may be reviewed to determine if optimal transitioning is performed. Analysis may be performed to determine if processing is being performed for objects that do not need processing due to invalid SMS specifications; performance and storage usage may be reviewed to determine optimal paths based on the predicted movement patterns to determine what tuning can be performed. Tuning patterns can be graded based on customer's chief concerns, higher performance or efficient storage usage. The customer's preferences may also be taken into account when providing recommendations.

Next, the report of recommended configuration changes and expected results may be presented to the customer in a report. The customer then may select which configuration will align most closely with their object storage needs. The storage service provider may then provide a report of alternative settings and optimal performance for the perceived workload. Also, recommendations based on object access, recall, or lack of access for a particular management class may be provided. Information in the report may include a number of objects set to expire or a number allowed, how many objects to be transitioned and how many to have backup/backup2's written, how many objects are in recall mode, analysis of object patterns from those that reside on a direct access storage device (DASD) that have not been accessed within a time frame (e.g., 90 days), how much storage is being used by recalled objects, and identification of invalid or unnecessary processing due to parmlib settings or expiration settings.

Recommendations may be made based on preferences provided by the customer as well as alternatives that included improved (e.g., maximized) performance and improved (e.g., maximized) storage usage. Recommendations may include adjustments to management class transition criteria, performance tuning within the OAM parmlib values to increase performance, performance tuning within the OAM parmlib values to better utilize storage, performance tuning within the OAM parmlib values to reduce or eliminate unnecessary processing of objects, specific object management recommendations based on usage, expiration suggestions and expected outcomes, recommendations regarding hardware usage or need, and changes to CBRHADUX user exit, if necessary.

The final phase may include providing specific details to the client on how to manually update confirmation files, or to automatically incorporate some of those changes. For instance, changes to the SMS settings in the ACS routines could be changed automatically via aspects of the disclosure. Based on the changes recommended, the client may be able to apply changes globally or individually. These changes may be made by changing SMS constructs, changing ACS routines, modifying CBROAMxx parmlib dynamically, modifying IEFSSNxx parmlib values manually, and updating the expiring object to new management class to prevent expiration and selection.

In addition to embodiments described above, other embodiments having fewer operational steps, more operational steps, or different operational steps are contemplated. Also, some embodiments may perform some or all of the above operational steps in a different order. The modules are listed illustratively according to an embodiment and are not meant to indicate necessity of a particular module or exclusivity of other potential modules.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination thereof. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof. In the context of this disclosure, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination thereof.

Computer program code for carrying out operations for aspects of the present disclosure may be written in any combination of one or more programming languages, including: an object oriented programming language such as Java, Smalltalk, C++, or the like; and conventional procedural programming languages, such as the "C" programming language or similar programming languages. The program code may execute as specifically described herein. In addition, the program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been described with reference to flowchart illustrations, block diagrams, or both, of methods, apparatuses (systems), and computer program products according to embodiments of this disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions or acts specified in the flowchart or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

While the foregoing is directed to exemplary embodiments, other and further embodiments of the disclosure may be devised without departing from the basic scope thereof, and the scope thereof is determined by the claims that follow.

What is claimed is:

1. A computer-implemented method for managing a storage system, the method comprising:
   determining, by a processor, using first data of a first configuration of the storage system and second data related to element interactions of the storage system, a first operational characteristic of the first configuration, wherein the first data comprises object expiration data;
   generating, by the processor, using the second data, at least a second configuration of the storage system that differs from the first configuration;
   predicting, by the processor, using the second data, and prior to applying the second configuration, at least a second operational characteristic of the second configuration;
   applying, by the processor, the second configuration to the storage system by automatically incorporating at least one change to the storage system, wherein the at least one change to the storage system includes performance tuning within settings for an object-access-method parameter library that is part of a data set in an operating system that contains current customer settings; and
   predicting, by the processor, using the second data, and prior to applying the second configuration, at least a third operational characteristic of a third configuration of the storage system that differs from the first and second configurations.

2. The method of claim 1, further comprising collecting, by the processor, the first data of the first configuration of the storage system.

3. The method of claim 1, further comprising:
prior to predicting the third operational characteristic, generating, by the processor and using the second data, the third configuration of the storage system.

4. The method of claim 1, further comprising proposing, by the processor and prior to applying the second configuration, a suggested configuration for the storage system based on a preferred operational characteristic.

5. The method of claim 1, wherein the first data comprises a client preference category of information related to a performance factor and a storage usage factor.

6. The method of claim 1, wherein the first data also includes at least one of a group consisting of:
a storage-construct category of information that includes a storage group, a management class, and a storage class;
an automatic-class-selection (ACS) routine category of information that includes transition outcomes for the management class and the storage class;
an administration category of information that includes naming information;
a directory category of information that includes metadata about objects;
a parameter-settings category of information that includes client preferences, delay information, and allocation choices;
and
a client preference category of information related to a performance factor and a storage usage factor.

7. The method of claim 1, wherein the second data related to element interactions of the storage system includes information related to an interaction of components of the storage system and is associated with at least one of a storage-construct category of information, an automatic-class-selection (ACS) routine category of information, an administration category of information, a directory category of information, a parameter-settings category of information, an exit category of information, and a client preference category of information.

8. The method of claim 1, wherein the first and second configurations include at least one value for at least one of a storage-construct category of information, an automatic-class-selection (ACS) routine category of information, an administration category of information, a directory category of information, a parameter-settings category of information, an exit category of information, and a client preference category of information.

9. The method of claim 1, wherein the first and second operational characteristics include at least one of a performance factor and a storage usage factor.

10. A computer program product, the computer program product comprising a computer readable storage medium having program instructions embodied therewith, wherein the computer readable storage medium is not transitory per se, the program instructions executable by a computer to cause the computer to:
collect, by a processor, data related to the performance and usage of a storage system, wherein the collected data comprises the initial access response seconds and sustained data rate data specified by a customer user of the storage system;
predict storage activities based on current settings by analyzing, by the processor, the collected data against experiential data, wherein the analyzing comprises:
selecting objects that require processing from an object directory table based on the current date;
obtaining a transition status by determining transition and back-up requirements of the selected objects; and
determining objects that have not been accessed within a threshold amount of time;
generate, by the processor and based on the predicted storage activities, alternate settings of the storage system;
predict, by the processor, expected results of the alternate settings;
present, by the processor, the alternate settings and predicted results to the customer user of the storage system;
obtain, by the processor, selected settings for the storage system from the customer user; and
provide, by the processor, instructions for incorporating the selected settings to the customer user, wherein the instructions comprise changing SMS constructs and ACS routines.

11. The computer program product of claim 10, wherein the alternate settings comprise manual modifications to IEFSSNxx parmlib values.

12. A system for managing a storage facility, the system comprising one or more processors coupled to a memory and configured to perform a method comprising:
determining, by the processor and using first data of a first configuration of the storage system and second data related to element interactions of the storage system, a first operational characteristic of the first configuration;
generating, by the processor and using the second data, at least a second configuration of the storage system that differs from the first configuration;
predicting, by the processor using the second data, and prior to applying the second configuration, at least a second operational characteristic of the second configuration;
applying, by the processor, the second configuration to the storage system by automatically incorporating at least one change to the storage system, wherein the at least one change to the storage system includes performance tuning within settings for an object-access-method parameter library that is part of a data set in an operating system that contains current customer settings; and
predicting, by the processor, and using the second data, at least a third operational characteristic of a third configuration of the storage system that differs from the first and second configurations.

13. The system of claim 12, wherein the one or more processors are further configured to collect the first data of the first configuration of the storage system.

14. The system of claim 12, wherein the one or more processors are further configured to, prior to predicting the third operational characteristic, generate, using the second data, the third configuration of the storage system.

15. The system of claim 12, wherein the one or more processors are further configured to propose a suggested configuration for the storage system on a preferred operational characteristic.

16. The system of claim 12, wherein training a user comprises providing specific details to the user on how to manually update confirmation files.

17. The system of claim 12, wherein the first data includes at least one of a group consisting of:
a storage-construct category of information that includes a storage group, a management class, and a storage class;

an automatic-class-selection (ACS) routine category of information that includes transition outcomes for the management class and the storage class;

an administration category of information that includes naming information;

a directory category of information that includes metadata about objects;

a parameter-settings category of information that includes client preferences, delay information, and allocation choices;

an exit category of information that includes object expiration permissions; and a client preference category of information related to a performance factor and a storage usage factor.

18. The system of claim 12, wherein the second data related to element interactions of the storage system includes information related to an interaction of components of the storage system and is associated with at least one of a storage-construct category of information, an automatic-class-selection (ACS) routine category of information, an administration category of information, a directory category of information, a parameter-settings category of information, an exit category of information, and a client preference category of information.

19. The system of claim 12, wherein the first and second configurations include at least one value for at least one of a storage-construct category of information, an automatic-class-selection (ACS) routine category of information, an administration category of information, a directory category of information, a parameter-settings category of information, an exit category of information, and a client preference category of information.

20. The system of claim 12, wherein the first and second operational characteristics include at least one of a performance factor and a storage usage factor.

* * * * *